US009233716B2

(12) United States Patent
Midoun et al.

(10) Patent No.: US 9,233,716 B2
(45) Date of Patent: Jan. 12, 2016

(54) VEHICLE FRAME COMPONENT (71) Applicant: Ford Global Technologies, LLC, Dearborn, MI (US)

(72) Inventors: Djamal Eddine Midoun, Ann Arbor, MI (US); Jamil M. Alwan, Ann Arbor, MI (US); Joe L. Buchwitz, Huntington Woods, MI (US); Hermann J. Salenbauch, Bloomfield Hills, MI (US); Steven Mayes, Dearborn, MI (US); Jonatan Leff Yaffe, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 7 days.

(21) Appl. No.: 14/292,664

(22) Filed: May 30, 2014

(65) Prior Publication Data

US 2015/0344073 A1 Dec. 3, 2015

(51) Int. Cl.
*B60N 99/00* (2006.01)
*B62D 21/15* (2006.01)

(52) U.S. Cl.
CPC .................................. *B62D 21/155* (2013.01)

(58) Field of Classification Search
CPC .... B62D 21/00; B62D 21/152; B62D 21/155; B62D 25/08; B62D 25/082; B60R 19/42; B60R 19/16; B60R 2019/002
See application file for complete search history.

(56) References Cited

U.S. PATENT DOCUMENTS

| 5,275,436 | A * | 1/1994 | Pomero .......................... 280/784 |
| 6,286,867 | B1 * | 9/2001 | Braemig et al. .............. 280/784 |
| 6,364,358 | B1 * | 4/2002 | Miller ........................... 280/784 |
| 6,511,119 | B2 * | 1/2003 | Takase et al. ............ 296/187.09 |
| 6,578,904 | B1 | 6/2003 | Yvetot et al. |
| 6,866,115 | B2 * | 3/2005 | Miyasaka ..................... 180/311 |
| 6,994,374 | B2 * | 2/2006 | Miyasaka ..................... 280/784 |
| 7,819,218 | B2 * | 10/2010 | Eichberger et al. ........... 180/274 |
| 8,414,041 | B2 | 4/2013 | Paare et al. |
| 8,480,130 | B2 * | 7/2013 | Dandekar et al. ............. 280/784 |
| 8,608,231 | B1 * | 12/2013 | Mendivil et al. ......... 296/187.03 |
| 2010/0171282 | A1 | 7/2010 | MacIsaac |
| 2010/0327626 | A1 * | 12/2010 | Baumann ................. 296/187.09 |

(Continued)

FOREIGN PATENT DOCUMENTS

| DE | 19810864 | 9/1998 |
| DE | 102004008740 | 6/2005 |

(Continued)

OTHER PUBLICATIONS

Wasiowych et al., "Energy Absorption for a Truck-Front Bumper Bar", International Journal of Crashworthiness, vol. 1, Issue 3, 1996.

*Primary Examiner* — Lori L Lyjak
(74) *Attorney, Agent, or Firm* — Raymond L. Coppiellie; Bejin Bieneman PLC (57) ABSTRACT A body on frame vehicle includes a SORB impact load management system including front blocker structures for limiting transfer of the SORB impact loads from being transferred to the passenger compartment area. A SORB impact load transfer apparatus in the form of a cable extends between the front end horns of the side rails of the frame to transfer SORB impact loads from the impacted side across the vehicle frame. In a second embodiment of the impact load transfer apparatus, the ends of the cables are coupled to the front sides of the front blocker structures and the cable is routed through the front end horns of the side rails of the frame to transfer SORB impact loads from the impacted side across the vehicle frame.

16 Claims, 12 Drawing Sheets

(56) References Cited

U.S. PATENT DOCUMENTS

| | | | |
|---|---|---|---|
| 2012/0313360 A1* | 12/2012 | Akaki et al. | 280/784 |
| 2013/0341969 A1* | 12/2013 | Fujii et al. | 296/193.07 |
| 2014/0015265 A1 | 1/2014 | Ahn | |
| 2015/0048650 A1* | 2/2015 | Gupta et al. | 296/187.1 |

FOREIGN PATENT DOCUMENTS

| | | |
|---|---|---|
| EP | 2138356 | 12/2009 |
| EP | 2511160 | 10/2012 |
| JP | H09169283 | 6/1997 |
| WO | 2010069087 | 6/2010 |

\* cited by examiner

VEHICLE FRAME COMPONENT

BACKGROUND

It is generally known to provide a vehicle including a vehicle frame assembly of any known or appropriate type such as a unitary body on frame assembly. It is also generally known to provide a vehicle including various structures for improving the performance of the vehicle during a variety of types of impacts to the vehicle. The performance of a vehicle and its various structures, assemblies and components from an impact may be assessed using a variety of crash tests and analytical methodologies.

A frontal crash having a relatively small amount of overlap or offset may be designed to attempt to replicate what may happen when only a relatively small portion of the front corner of a vehicle collides with another object like a vehicle, tree, utility pole or the like. One known industry test is the small overlap rigid barrier (SORB) test. In the SORB test, a vehicle travels at 40 mph toward a 5-foot-tall rigid barrier and only the outer 25% of the vehicle width is impacted into the barrier. It is generally understood that most modern vehicles may be designed to have safety cages and other structures, assemblies and components for protecting the occupant compartment and built to help manage energy with controlled and limited deformation to the vehicle during a variety of impacts to the vehicle from most direction, including a head-on and overlap frontal crashes. The crush zones of the main body and frame structures are designed to manage the crash energy to reduce forces on the occupant compartment and its occupants. When a crash involves these structures, the occupant compartment may generally be protected from intrusion, and the airbags and safety restraints may perform to restrain and help protect vehicle occupants.

Small overlap or offset frontal crashes primarily affect a vehicle's outer edges, which may not be directly protected by some of the primary crush-zone structures. In such a scenario, crash forces may go directly into the front wheel, suspension system and potentially the vehicle firewall and body including the passenger compartment. In a small overlap crash which does not engage the main structures of the vehicle it may be possible for the wheel to be forced rearward towards the passenger compartment of the body of the vehicle.

Even though such crush-zone and body (or cab) on frame type structures have been known and have some certain advantages, there remains a continuing and significant need to provide improved impact or crush performance structures with optimized structural efficiencies including lower cost and improved performance. There remains a significant a need to address and improve the SORB impact performance of a vehicle and to develop alternative designs and components which improve the IIHS SORB structural and overall rating performance. In particular, there remains a continuing and significant need to provide additional improved SORB impact performance in a vehicle that will include better managing the impact forces for reducing intrusion of the forward structures.

DETAILED DESCRIPTION

Figure 2:
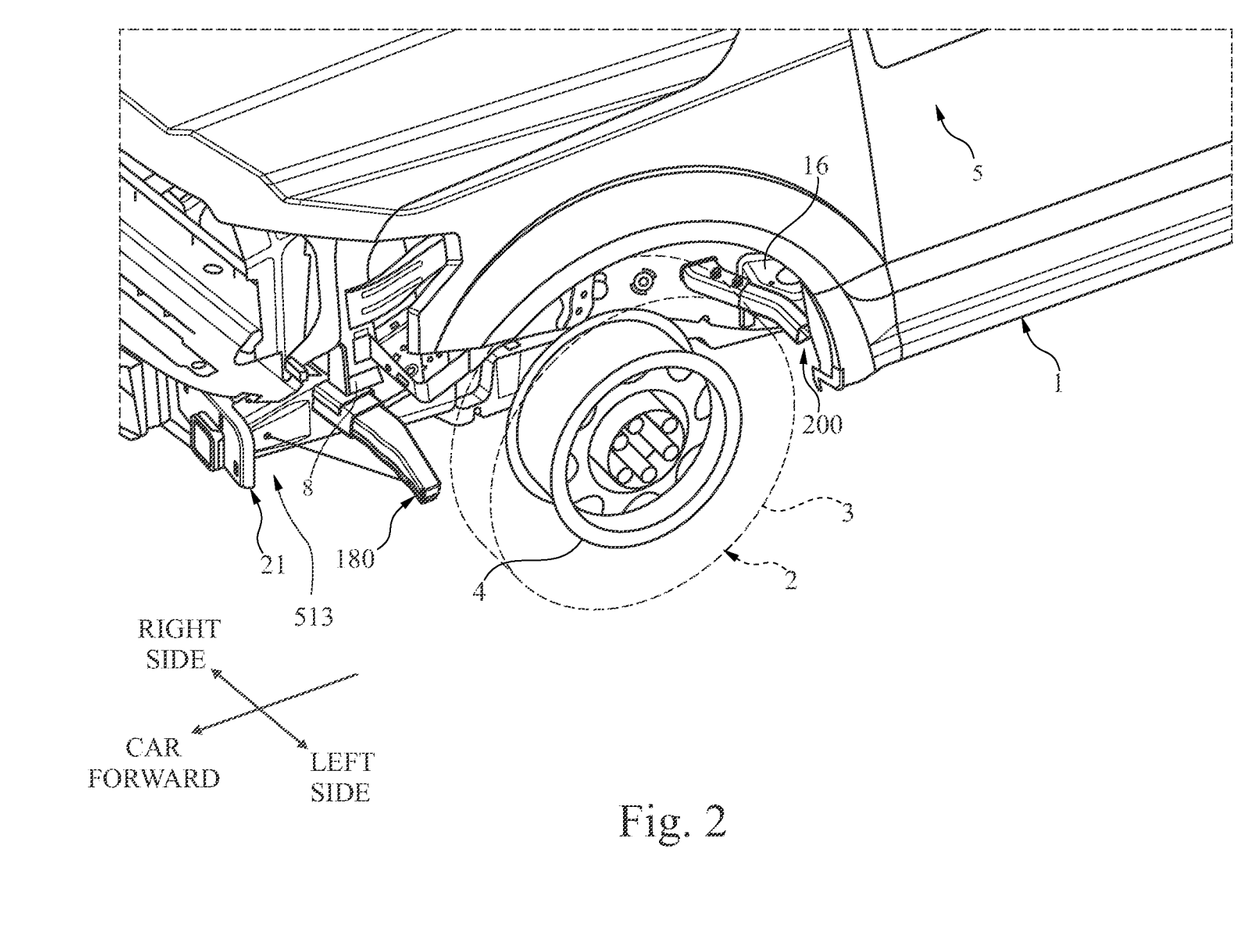
FIG. 2 is a partial, perspective graphic view of a vehicle including a front blocker structure and impact load transfer system according to an exemplary embodiment of the present disclosure.
Figure 3:
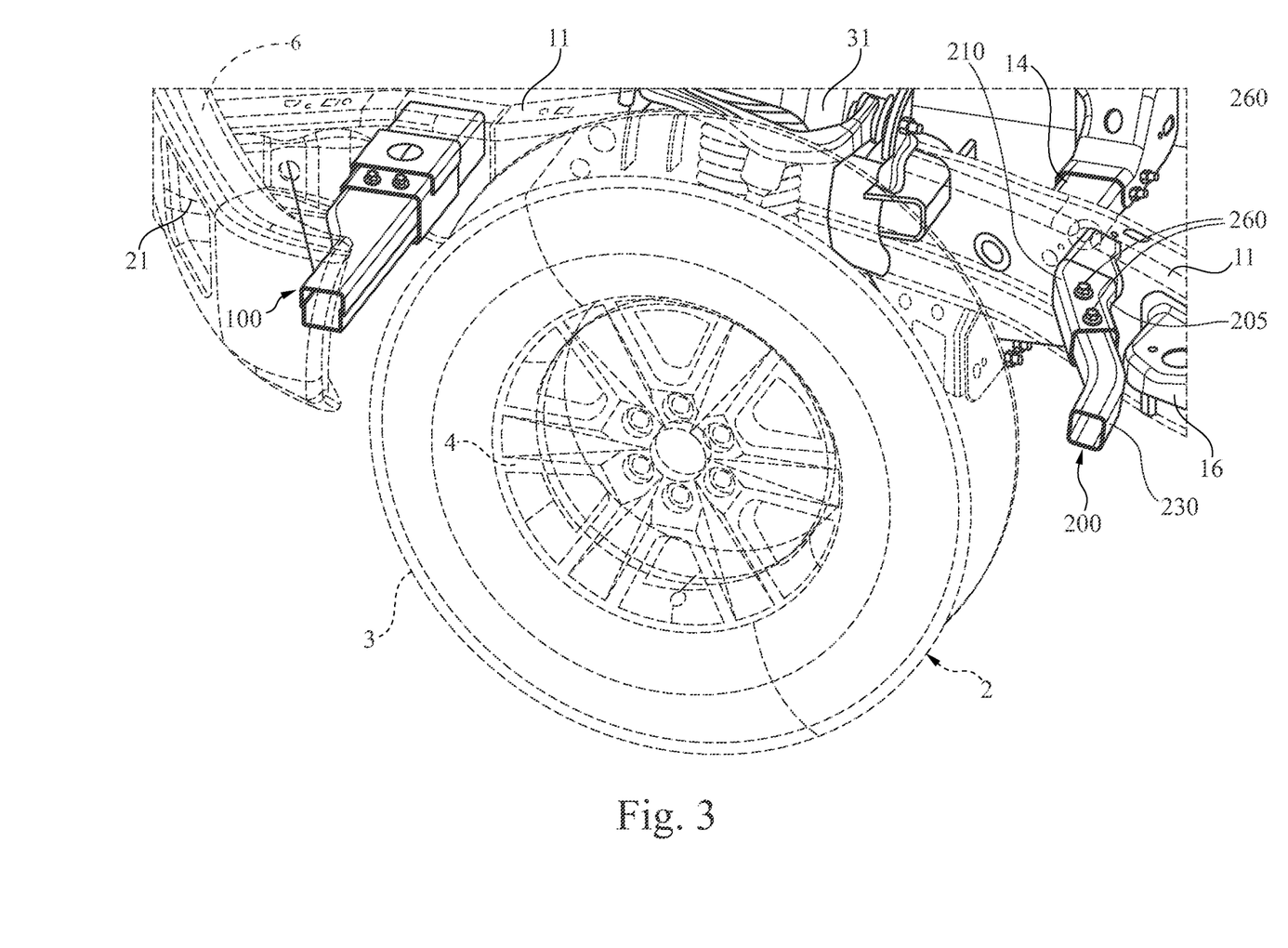
FIG. 3 is a perspective graphic view of a front blocker structure and load transfer system according to an exemplary embodiment of the present disclosure.

Referring in general to all of the Figures and in particular to FIGS. 2 through 12, there is disclosed in an exemplary embodiment of an impact load transfer system incorporated in a vehicle 1. The vehicle 1 may include wheels 2 for providing mobility to the vehicle 1 as is well known. The wheels 2 may include tires 3 and rims 4. The vehicle 1 may include a vehicle frame 10 and a cab or body 7 as best shown in FIG. 2. Accordingly, the vehicle 1 has a cab (or body) on frame construction such as may be known for use as a pickup, sport utility, cross-over, truck type vehicle. The vehicle 1 further includes a bumper or impact absorber 6 located at the car forward end of the vehicle 1. Referring now with particular reference to FIG. 4, it may be observed that the vehicle frame 10 may include right-side and left-side side beams, frame rails or members 11 and 12, respectively, as may be generally known for a body on frame type vehicle 1. It should be noted that the frame side rails 11 and 12 generally extend in a direction aligned with the car forward direction of vehicle 1 is identified by the directional arrows on the left side of FIGS. 2 and 4 and may either be referred to first or second side frame rails.

The vehicle frame 10 may further include a plurality of cross members for coupling the left and right (or first and second) side rail frame members 11 and 12, respectively. A first cross frame member 13 is located proximal the car forward direction and the front wheels 2 and may extend between the left-side frame rail 11 and the right-side frame rail 12. A second cross frame member 14 also extends between the left-side frame rail 11 and the right-side frame rail 12 at a location rearward of the cross frame member 13 and generally aligned with and proximal the wheels 2 of the vehicle 1. A third cross frame member 15 extends between the left-side frame rail 11 and the right-side frame rail 12 and generally distal the second cross frame member 14 in a vehicle rearward direction and generally aligned under the body or passenger compartment 5 of the vehicle 1. The cross frame members 13, 14 and 15 extend longitudinally aligned with the cross-car direction and are welded or coupled to the left-side frame rail 11 and the right-side frame rail 12 using any known or appropriate structure or process.

Figure 4:
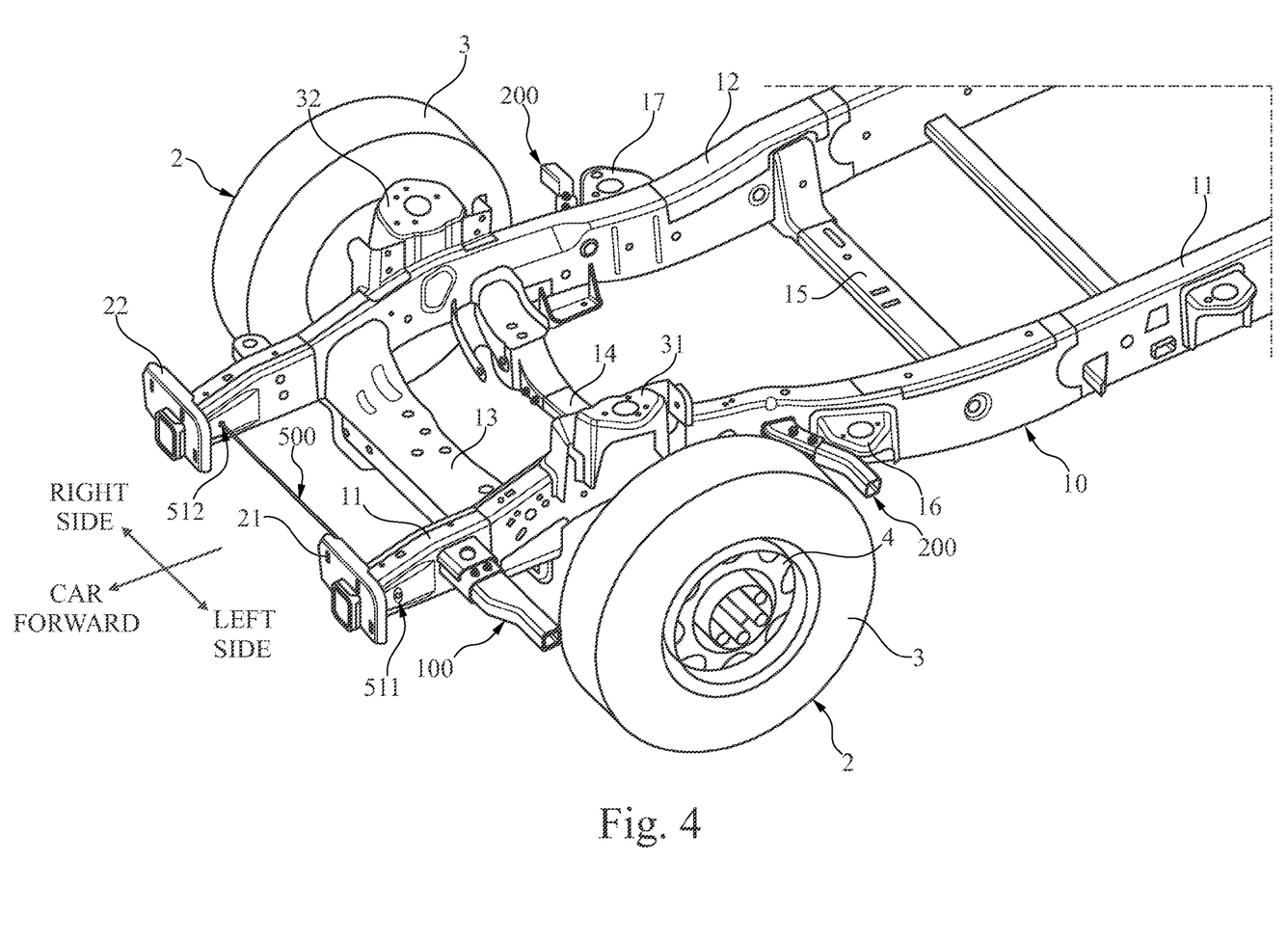
FIG. 4 is a partial, perspective graphic view of a vehicle frame including the load transfer system according to an exemplary embodiment of the present disclosure.

The vehicle frame 10 may further include left-side and right-side body mount brackets 16 and 17, respectively, located proximal the second and third cross frame members 14 and 15, respectively, and coupled to the left-side and right-side side frame rails 11 and 12, respectively as best shown in FIG. 4. Each of the body mount brackets 16 and 17 may include a passage or hole for receiving a post or other extension member of the body 7 for coupling the body 7 to the vehicle frame 10. The vehicle frame 10 may further include a pair of left-side and right-side shock tower brackets 31 and 32, respectively, located proximal the wheels 2 and between the first and second cross frame members 13 and 14, respectively, and coupled to the left-side and right-side side frame rails 11 and 12, respectively. The left-side and right-side shock tower brackets 31 and 32 may each include a passage or hole receiving a poster other extension member of the body 7 for coupling the body 7 to the vehicle frame 10. The vehicle frame 10 may further include left-side and right-side front impact absorber or bumper mount brackets 21 and 22, respectively, coupled to the car forward horns or ends of the left-side and right-side side frame rails 11 and 12, respectively. The vehicle frame 10 and its various components may be preferably made from a high strength and/or ultra-high strength steel and may be coupled together using known or appropriate fastening or coupling structure or process, including in particular a metal inert gas (MIG) welding process.

Figure 1:
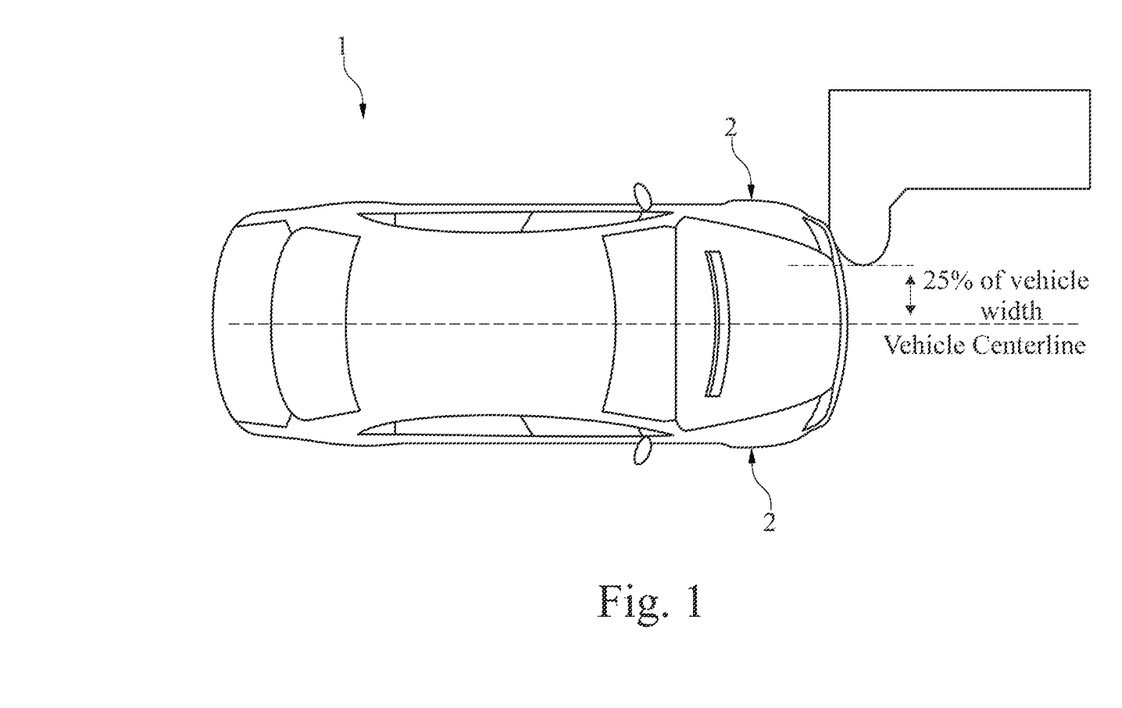
FIG. 1 is an overhead graphic view of a small overlap rigid barrier (SORB) frontal crash test simulation including a vehicle.
Figure 8:
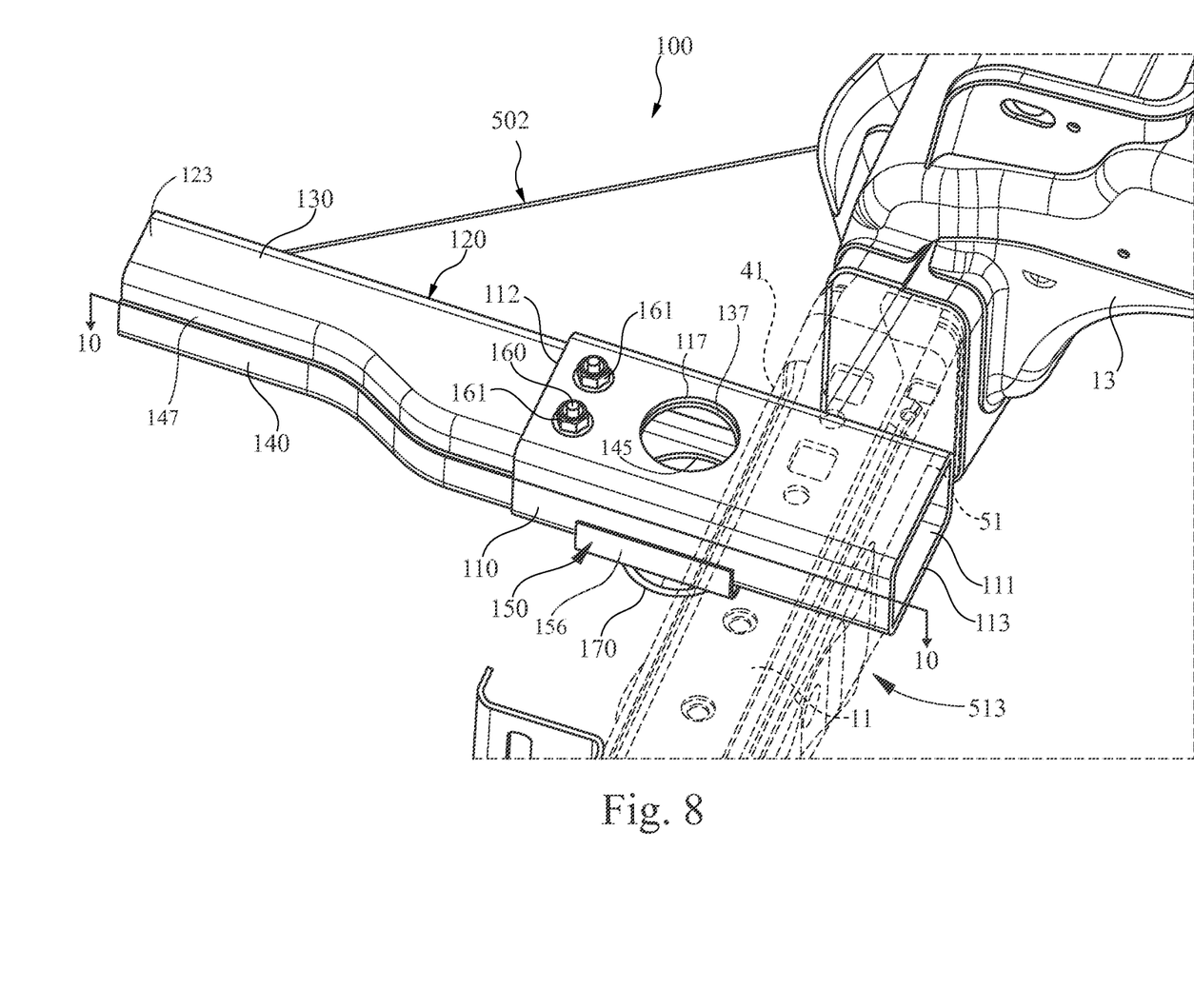
FIG. 8 is an alternate partial, perspective graphic view of the exemplary embodiment of FIG. 6 detailing the integration of the front blocker structure with the side frame rail of the vehicle frame.

The vehicle frame 10 may further include left-side and right-side front blocker structures 100 and left-side and right-side rear blocker structures 200 coupled to the left side and right side frame members 11 and 12, respectively. The front blocker structures 100 are coupled to the side frame rails 11 and 12 at a location car forward and proximal the wheels 2. The left side vehicle frame rail 11 includes a first hole or passage 41 and the left side wall of the frame rail 11 includes a second hole or passage 51 in the right side wall of the frame 11 as best shown in FIG. 8. The front blocker structure 100 is located in and extends through the first passage 41 and the second passage 51. The front blocker structure 100 extends in a direction substantially aligned with the cross car direction (which is normal or perpendicular to the car forward direction) and outward from the frame rail 11 such that in a small overlap frontal impact (where the impact is less than 25% of the vehicle width (see FIG. 1)), the front blocker structure 100 will be impacted before the wheel 2. Since the front blocker structure 100 is coupled to the left side vehicle frame rail 11, at least a portion of the energy of the small overlap impact will be transferred to the left side frame rail 11 and therefore not transferred to the wheel 2. Since there is less energy transferred to the wheel 2, there will be less energy to move the wheel 2 toward the body 7 of the vehicle 1 and therefore there will be less intrusion of the occupant compartment 5. Accordingly, it may be appreciated that the front blocker structures 100 may function to limit, and to control and guide the movement of the wheel 2 during an small overlap rigid barrier impact to the vehicle 1.

Figure 6:
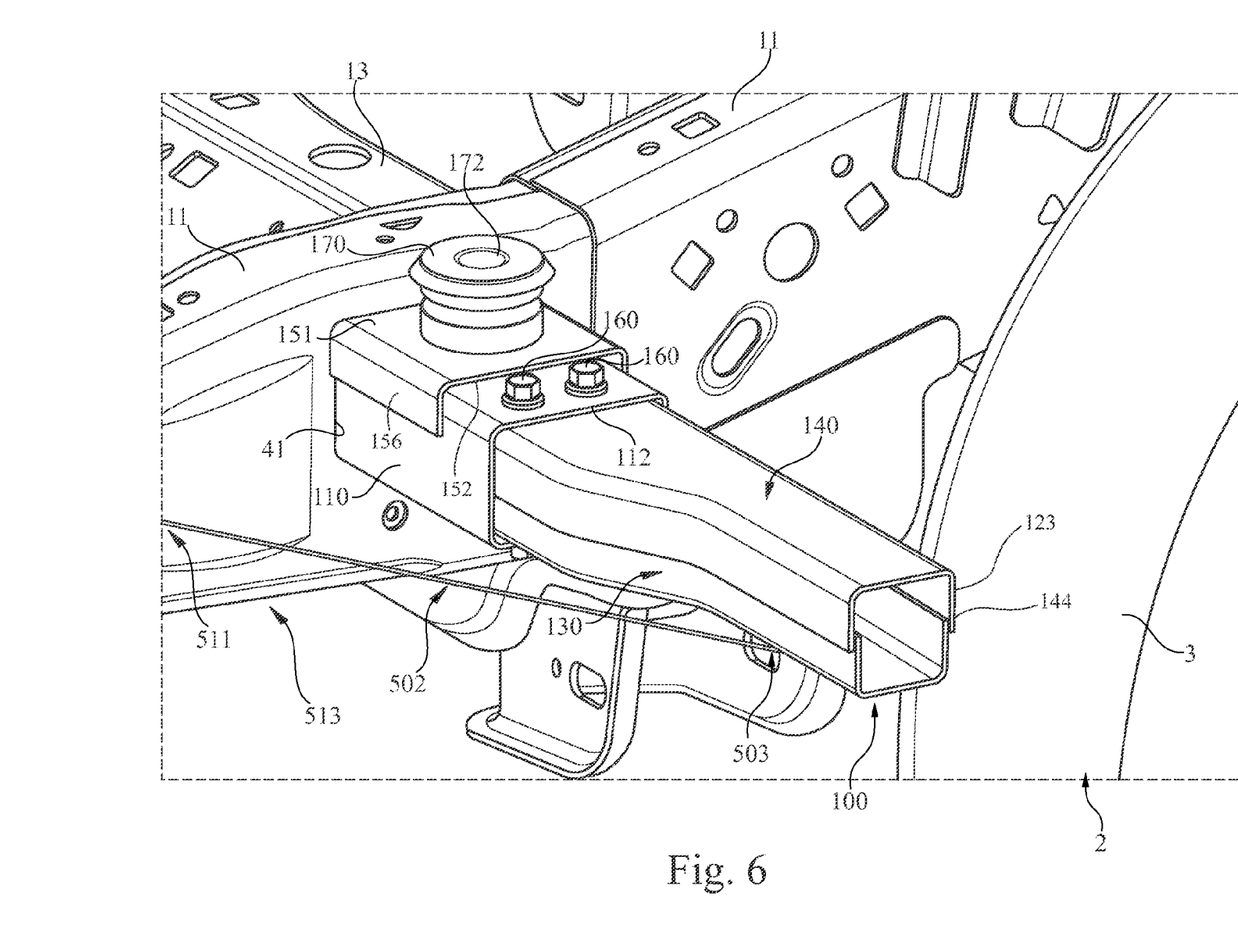
FIG. 6 is an alternate partial, perspective graphic view of a vehicle frame including a front blocker structure and impact load transfer system according to the exemplary embodiment of FIG. 3.
Figure 7:
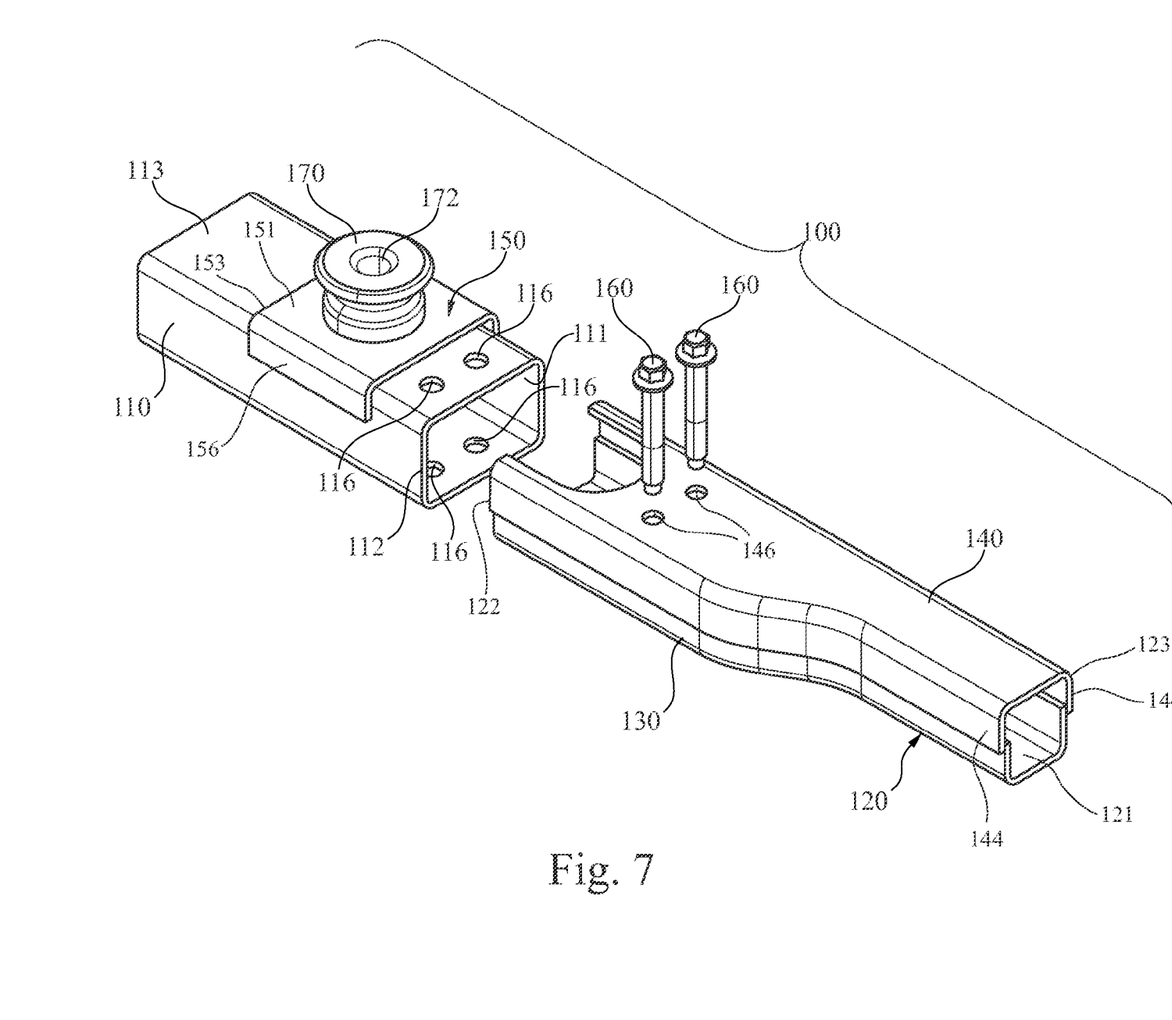
FIG. 7 is a partially exploded, perspective view detailing the components of the front blocker structure of FIG. 6.
Figure 9:
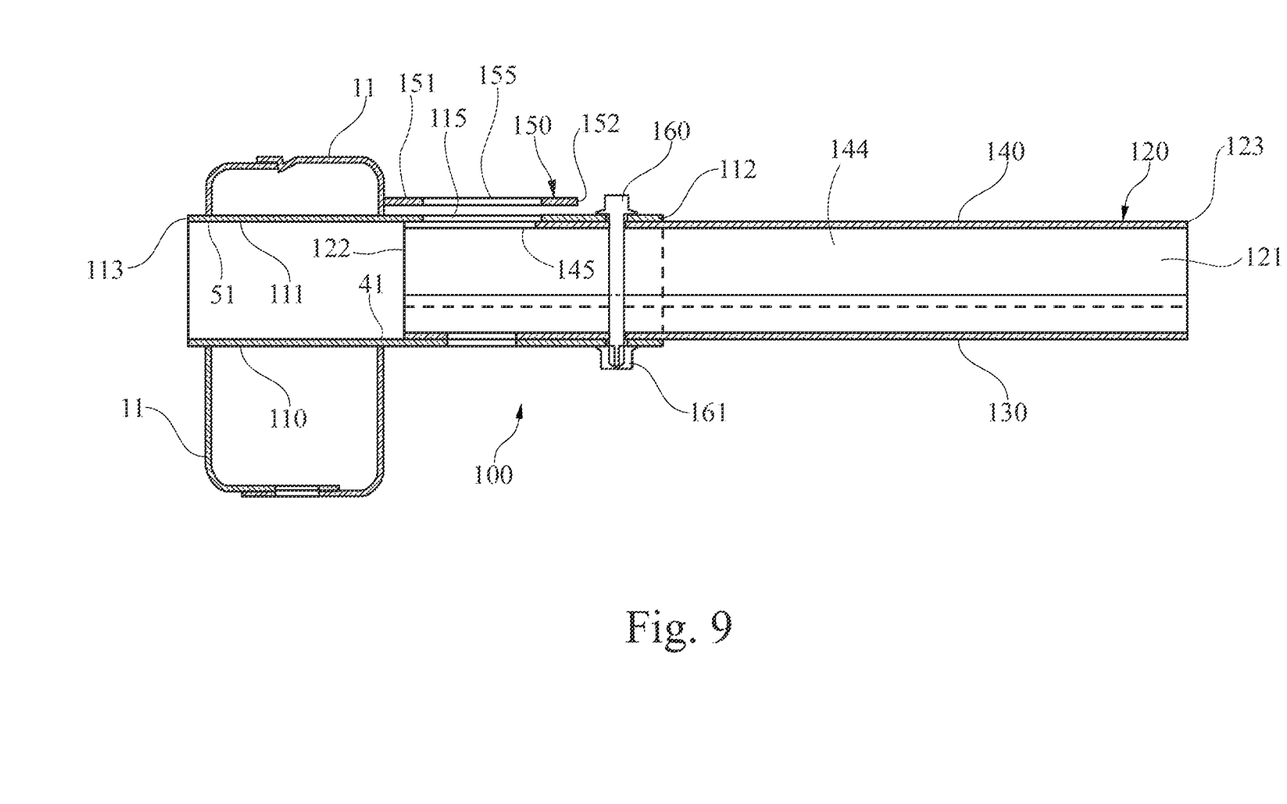
FIG. 9 is a graphic section view of the exemplary embodiment of the blocker structure of FIG. 5 taken along the line 9-9 shown therein.
Figure 10:
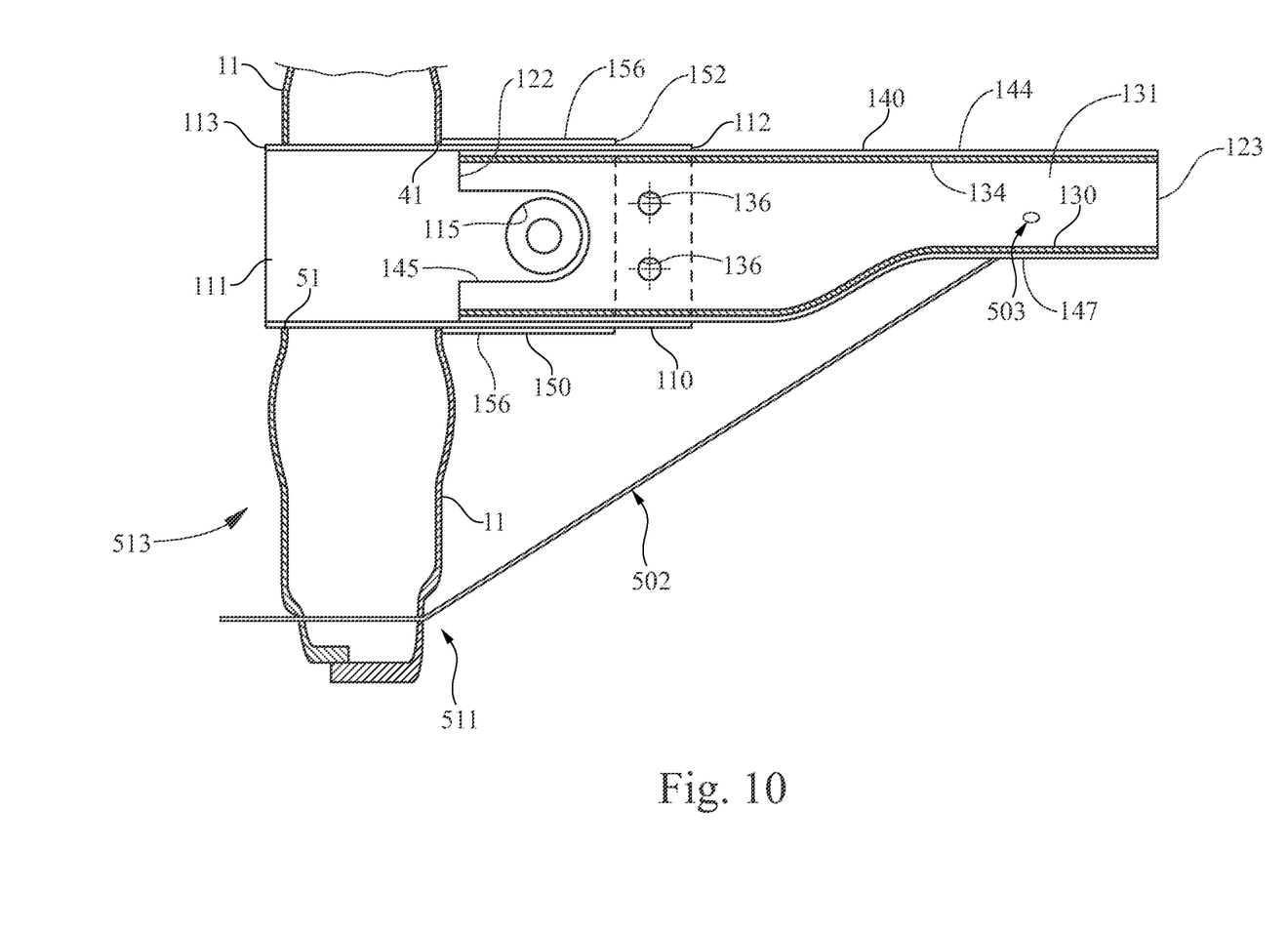
FIG. 10 is a partial, graphic section view of the exemplary embodiment of the blocker structure of FIG. 8 taken along the line 10-10.

Referring with particular reference to FIGS. 7 through 10, the details of the front blocker structure 100 are shown. In particular, the front blocker structure 100 includes a base member 110 and an extension member 120. The front blocker structure 100 may also include, in one particular exemplary embodiment, a body mount bracket or base member 150 coupled to the base member 110. The body mount bracket 150 may preferably be a stamped high strength or ultrahigh strength steel material that includes a generally planar middle portion 151 and depending or folded legs 156. The middle portion 151 and the legs 156 may preferably be sized to correlate with the outer perimeter of the base member 110. The mounting bracket 150 includes a first end 152 and a second end 153 as best shown in FIGS. 6 and 7. The mounting bracket 150 may further include an opening, hole or passage 155 in the planar middle portion 151. The hole 155 may preferably be aligned with the hole 115 in the base member 110 and the passage 145 in the extension member 120 as best shown in FIG. 9. In one exemplary embodiment according to the present disclosure, the distal ends of the legs 156 may be welded to the outer periphery of the base member 110 using a MIG welding process.

In one particular exemplary embodiment, the base member 110 of the front blocker structure 100 may be a generally tubular structure made from a high strength or ultrahigh strength steel using a stamping, forming and welding process or any other known and appropriate process for producing an object from such material. The base member 110 includes a first end 112 and a second end 113 and has a generally longitudinal extent there between defining a generally longitudinal axis. The base member 110 has a generally rectangularly shaped cross-section in a direction perpendicular to the longitudinal axis but may have other known and appropriate cross-section shapes. The base member 110 has a generally tubular shape including a cavity, chamber or passage 111 extending from the first end 112 to the second end 113. The base member 110 further includes a plurality of holes or passages 116 in its upper and lower surfaces and located proximal the end 112. The base member 110 is coupled by welding to the left side frame rail 11, as best shown in FIGS. 8 and 9.

The base member 110 of the front blocker structure 100 is welded to the holes 41 and 51 in the left side frame rail 11. The end 113 of the base member 110 may extend inboard of the left side frame rail 11 in the cross car direction a sufficient amount such that a MIG weld may be formed around the entire perimeter of the base member 110 and the opening hole 51 of the left side frame rail 11. Similarly, a MIG weld may be formed around at least a portion of (or alternatively the perimeter of) the base 110 and the opening hole 41 of the left side frame rail 11 to securely couple the base member 110 of the front blocker structure 100 to the vehicle frame 10. Alternatively the weld may be of any known or appropriate type and may be formed around the entire perimeter of the openings 41 and 51. The base member 110 further includes an opening or hole or passage 115 in the upper surface and located between the first end 112 and the second end 113. The base member 110 further includes an opening or hole or passage 117 in the lower surface and located between the first end 112 and the second end 113 and the hole 117 is generally aligned and overlapping with the hole 115 to provide the ability for a structure (such as a mounting post of the body 7) and assembly tools to pass through the components of the base member 110.

The front blocker structure 100 may further include the extension member 120 which may be coupled to the base member 110. In one particular exemplary embodiment according to the present disclosure, the extension member 120 may include a first or bottom portion 130 and a second or upper portion 140 as best shown in FIGS. 7 through 10. The extension member 120 may be preferably coupled to the first end 112 of the base member 110 using any known or appropriate type of removable coupling, such as the fasteners 160. The extension member 120 has a generally longitudinal extent from a first end 122 to a second end 123. The extension member 120 has a generally tubular construction including a generally longitudinal axis and having a generally rectangularly shaped cross section in a direction perpendicular to the longitudinal axis of the extension member 120. Notably differing from the base member 110 which has a generally constant cross-section in a direction perpendicular to its longitudinal axis, the extension member 120 has a generally varying sized cross-section in a direction perpendicular to its longitudinal axis. The extension member 120 may have either a constant or a varied size cross-section (or a combination thereof) in a direction perpendicular to its longitudinal axis. Accordingly, the extension member 120 may include a generally hollow passage or chamber 121 extending from the first end 122 to the second end 123. The outer perimeter of the first end 122 of the extension member 120 may preferably be sized and shaped to be quickly and securely received in the passage 111 of the base member 110.

The first or bottom portion 130 of the extension member 120 may be formed from a high strength or ultrahigh strength steel in a stamping procedure to include a first surface 131 having a generally planar extent and including a pair of depending side extensions 134 and 137. The width of the first surface 131 varies between the first end 122 and the second end 123 of the bottom portion 130. The second or upper portion 140 of the extension member 120 may also be formed from a high strength or ultrahigh strength steel in a stamping procedure to include a first surface 141 having a generally planar extent and including a pair of depending side extensions 144 and 147 having complementary shapes to the depending side extensions 134 and 137 of the bottom portion 130. Since the depending side portions 144 and 147 overlap with at least a portion of the depending side extensions 134 and 137 of the bottom portion 130, the first surface 131 of the bottom portion 130 generally has the matching shape to the first surface 141 of the upper portion 140 but may be slightly larger. Accordingly, the extension member 120 may be assembled by producing the bottom portion 130, the top portion 140 and coupling the portions together and then welding them using a MIG welding or similar process.

In one exemplary embodiment according to the present disclosure, the first surface 141 of the upper portion 140 may include a passage or opening 145 extending from the first end 122 and toward the second end 123. The opening 145 in the upper surface 141 of the upper or top portion 140 of the extension member 120 overlaps with at least a portion of the openings 115 and 117 in the upper and lower surfaces, respectively, of the base member 110. Accordingly, as may be best seen in FIG. 9, the mounting post eight of the body 7 is may extend through openings in the base member 110 and the extension member 120 so the body 7 may be secured to the vehicle frame 10.

In one exemplary embodiment according to the present disclosure, the first surface 141 of the upper portion 140 may include holes 146 to be aligned with the holes 116 of the base member 110 when the first end 122 of the extension member 120 is received in the passage 111. Similarly, the first surface 131 of the bottom portion 130 may include holes 136 to be aligned with the holes 116 of the base member 110 and the holes 146 of the upper portion 140 when the first end 122 of the extension member 120 is received in the passage 111 of the base member 110. Accordingly, the extension member 120 may be coupled to the base member 110 using fasteners 160 which may be secured using nuts 161 which may be MIG or projection welded to the outer surface of the base member 110 once the fasteners 160 are inserted through the holes 146, 116 and 136 of the respective components and the nuts 161 are tightened. Accordingly, the design and construction of the front blocker structure 100 according to the present disclosure provides a bolt on extension member 120 to the base member 110 that may allow for more flexible assembly options.

In one exemplary embodiment according to the present disclosure, the front blocker structure 100 may further include a body mounting pad, support, member or structure 170 coupled to the body mount bracket 150. The body mounting support 170 may include a passage 172 extending through the body mounting support 170 and aligned with the hole 155 of the body mounting bracket 150. The body mounting support 170 may include any known or appropriate material and may preferably be made from an appropriately resilient yet sufficiently strong material for securely mounting the body 7 to the vehicle frame 10 while also helping to properly insulate the occupant compartment 5 of the body 7 from forces transferred form the vehicle frame 10.

In one particular exemplary embodiment according to the present disclosure, the extension member 120 may be coupled to the base member 110 at any appropriate time during the vehicle assembly process. In one exemplary embodiment, the extension member 120 may be coupled or assembled to the base member 110 during the manufacturing and assembly of the vehicle frame 10. In one particular exemplary embodiment according to the present disclosure, the extension member 120 may be separately produced from the production of the vehicle frame 10 and assembled to the vehicle frame 10 at any time prior to the body 7 being assembled to the vehicle frame 10. More particularly, the extension member 120 may be assembled to the vehicle frame 10 after the vehicle frame 10 has been produced and transported to the vehicle assembly plant where the body 7 may be assembled to the vehicle frame 10.

In one exemplary embodiment according to the present disclosure, the production of the vehicle frame 10 and the assembly of the vehicle 1 may include the process step of assembling the extension member 120 of the front blocker structure 100 to the base member 110 after the vehicle frame 10 has been transported to the assembly plant form the vehicle frame product plant or location. As indicated, the extension member 120 is coupled to the base member 110 using fasteners 160. In this manufacturing scenario, it is possible to produce the vehicle frames 10 including the base members 110 welded to the side frame rails 11 and 12 in a first vehicle frame manufacturing or production location and then ship the vehicle frames 10 to another location such as a vehicle assembly plant. The vehicle frames 10 may be stacked vertically and then the stacks of vehicle frames 10 may be loaded on a rail car or other carrier for shipping between locations. To reduce the costs of shipping it is desirable to have the stacks of vehicle frames 10 located as closely as possible together. In this particular exemplary embodiment, it should be appreciated that since vehicle frame 10 is shipped without the extension member 120 coupled to the base member 110 there will be no loss in the shipping density of the stacks of vehicle frames 10 on the rail car. Accordingly, in the present exemplary embodiment, the base members 110 are welded to the side frame members 11 and 12 during the assembly and production of the vehicle frame 10 and the base members 110 are sized such that the first end 112 of the base member 110 extends outboard of the side frame members 11 and 12 only a limited distance such that multiple vehicle frames 10 may be stacked for shipping to the vehicle assembly plant without any loss to the stacking density of the stacks of vehicle frames 10 as compared to the stacking density of the stacks of vehicle frames before the inclusion of the front blocker structure 100 according to the present disclosure. The same principles may also be applied to the other blocker structures of the exemplary embodiments of the present disclosure.

In one alternate exemplary embodiment according to the present disclosure, it may be noted that it is possible for both the base member 110 and the extension member 120 to be assembled to the vehicle frame 10 at the vehicle assembly plant after the vehicle frames 10 have been shipped to the vehicle assembly plant without any loss in the stacking density of the vehicle frames 10. In one alternate exemplary embodiment, the vehicle frame 10 may be produced with the multiple openings 41 and 51 in the side frame rails 11 and 12 and then the base members 110 may be coupled to the side frame rails 11 and 12 at the vehicle assembly plant. This alternate construction and method of production for the front blocker structure 100 has particular utility when a one-piece front blocker structure may be desired.

Figure 11:
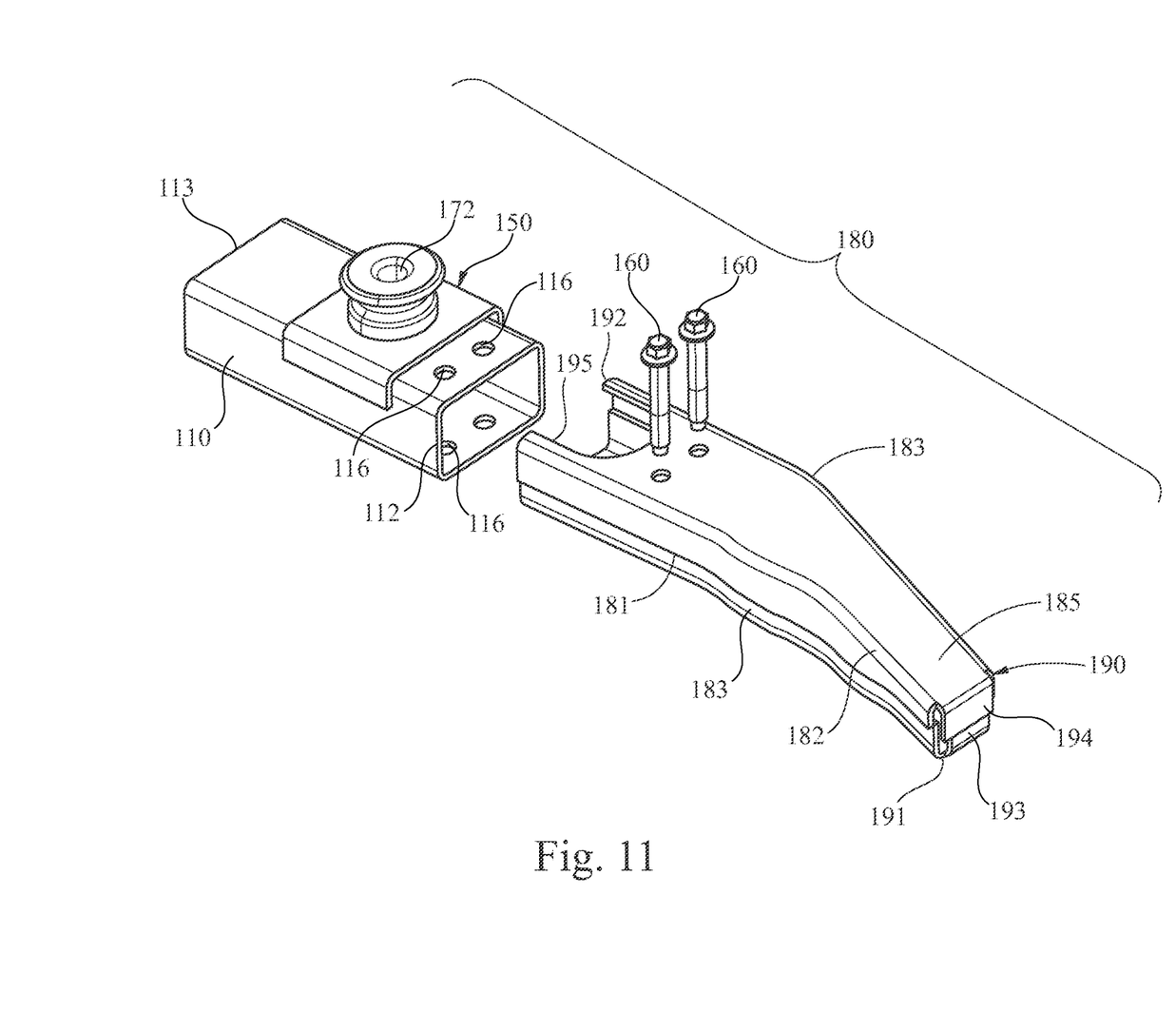
FIG. 11 is a partially exploded, perspective view detailing the components of a front blocker structure of an exemplary embodiment of the present disclosure.

Referring now in particular to the alternate exemplary embodiment of the present disclosure of FIGS. 2 and 11, there is disclosed a front blocker structure 180. The front blocker structure 180 may generally be similar in overall construction and application as the front blocker structure 100. The front blocker structure 180 may include a base member 110, a body mounting bracket 150 and a body support mount 170 that are generally the same as the front blocker structure 100. The front blocker structure 180 may include an extension member 190 having a unique construction as compared to the extension member 120 of the blocker structure 100.

The extension member 190 has a generally rectangular design and generally extends longitudinally and includes a longitudinal axis. The extension member 190 may include a first end 192 including an opening or passage 195 extending distally from the end 192 in a manner similar to the opening 145 in the end 122 of the extension member 120. The extension member 190 may further include holes 196 located distally from the end of the opening 195. The holes 196 may be distally located to be aligned with the holes 116 of the base member 110 when the end 192 of the extension member 190 is received in the passage 111 of the base member 110. The holes 196 may be located in sized appropriately to receive the fasteners 160 for coupling, or bolting on, the extension member 190 to the base member 110. The extension member 190 may include a car forward side 188 including an angle 182 from which and angled portion 185 extends and a car rearward side 189 including an angle 183 from which the angled portion 185 extends toward the end 191. The end 191 of the extension member 190 includes a lower portion 193 which is folded from the bottom surface of the extension member 190 and extends upward and an upper portion 194 which is folded from the top surface of the extension member 190 and extends downward as best shown in FIG. 11. In one exemplary embodiment of the present disclosure, the extension member 190 may preferably be produced as a single piece of high strength or ultrahigh strength sheet metal that may be stamped, punched, folded and formed into the shaped extension member 190 and including a seam 181.

While the vehicle 1 of the present disclosure is shown as including both front blocker structures 100 and rear blocker structures 200, it should be understood that it is possible to include either and/or both of the blocker structures on the vehicle as may be desired or appropriate for managing the crash forces and movement of the wheel and tire during a small overlap frontal impact to the vehicle 1 to limit the transfer of impact forces toward the passenger compartment 5 and its related structures. Generally, the rear blocker structure 200 may be designed and constructed in a manner similar to the front blocker structure 100. The rear blocker structure 200 may be coupled to the left-hand and right-hand side frame rail members 11 and 12, respectively, of the vehicle frame 10. The left-hand frame rail member 11 may again include the opening 41 in which and end of the rear blocker structure 200 may be inserted and passed through the left-hand frame rail member 11. The end of the rear blocker structure 200 may be coupled to the left-hand frame rail 11 using a MIG welding process. Referring now in particular to FIGS. 2 through 5 and 12, there is disclosed in more detail the rear blocker structure 200 according to an exemplary embodiment of the present disclosure.

Figure 12:
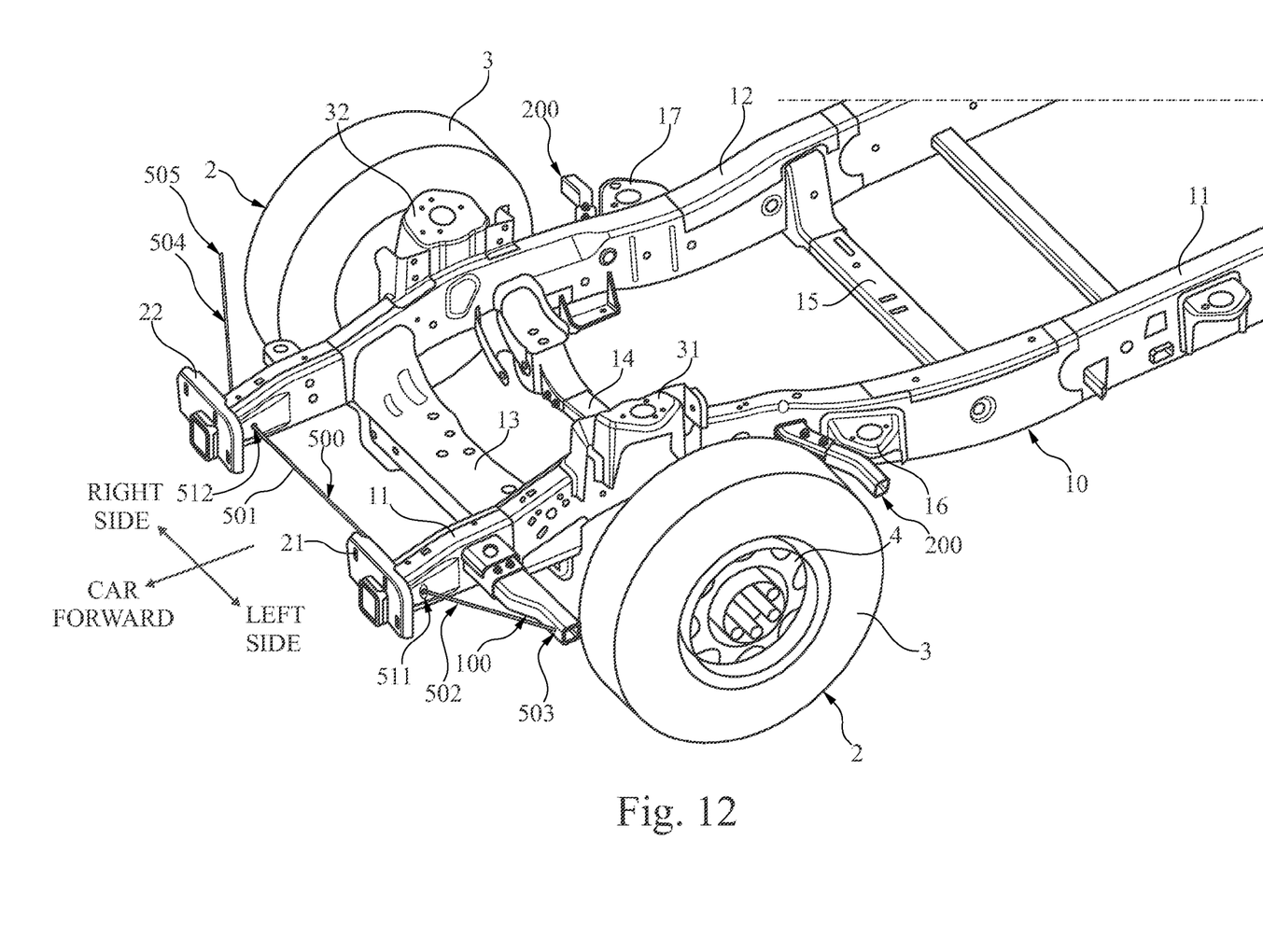
FIG. 12 is a partial, perspective graphic view of a vehicle frame including an alternate version of the impact load transfer system innovation according to an alternate exemplary embodiment of the present disclosure.

The rear blocker structure 200 may include a base member 210 which is shown in phantom lines in FIG. 12 to better show the coupling of an extension member 230 of the blocker structure 200 to the base member 210. The base member 210 includes an end 212 and has a generally square cross-section tubular shape including an opening or passage 211 extending between the ends of the base member 210. The base member 210 extends longitudinally and may include a bend or angle 205 along its longitudinal axis. The bend 205 is located outboard of the side of the left-hand frame rail 11 and aligns the end 212 of the base member and therefore the extension member 230 in a direction to avoid interfering with the envelope of the wheel 2 defined by the movement of the wheel 2 during normal operation of the vehicle 1. The extension member 230 may be a generally rectangular or square cross-section tubular shaped member including a passage extending from a first end 231 to a second end 232 which is inserted in the passage 211 of the base member 210. The extension member 230 may generally have any shaped cross-section appropriate for the noted application. The extension member 230 may have a generally longitudinal extent including a longitudinal axis. The extension number 230 includes a first portion including a first portion of the longitudinal axis and a second portion including a second portion of longitudinal axis. The first portion may be angularly offset from the second portion by a bend 235. Accordingly, the longitudinal axis of the first portion may also be angularly offset from the longitudinal axis of the second portion. The sizes and angles of the first and second portions and the bend 235 are selected to locate the second blocker structure 200 proximal the envelope of the wheel 2 so that the second blocker structure 200 is only engaged by the wheel 2 due to an impact to the vehicle 1 causing the wheel 2 to be moved toward and engage the rear blocker structure 200 which, being coupled unanchored in the frame rail 11, limits the movement of the wheel 2 toward the passenger compartment 5 of the body 7.

The base member 210 and the extension member 230 each may include holes (not shown) for receiving the bolts or fasteners 260 for coupling or bolting on the extension member 230 to the base member 210. Similar to the front blocker structure 100, the bolt on feature and structure of the rear blocker structure 200 allows the extension number 230 to be coupled to the base member 210 at the vehicle assembly plant and therefore allows for the continued use of the existing vehicle frame 10 transportation resources and maintaining the existing vehicle frame 10 shipping density. The use of the bolt on extension member 230 to the base member 210 further allows for continued use of the suspension alignment units and the existing frame and pedestal lines in the vehicle assembly plant. The rear blocker 200 may include a clip or support located in the passage of the base member 210 for receiving the fasteners 260.

Figure 5:
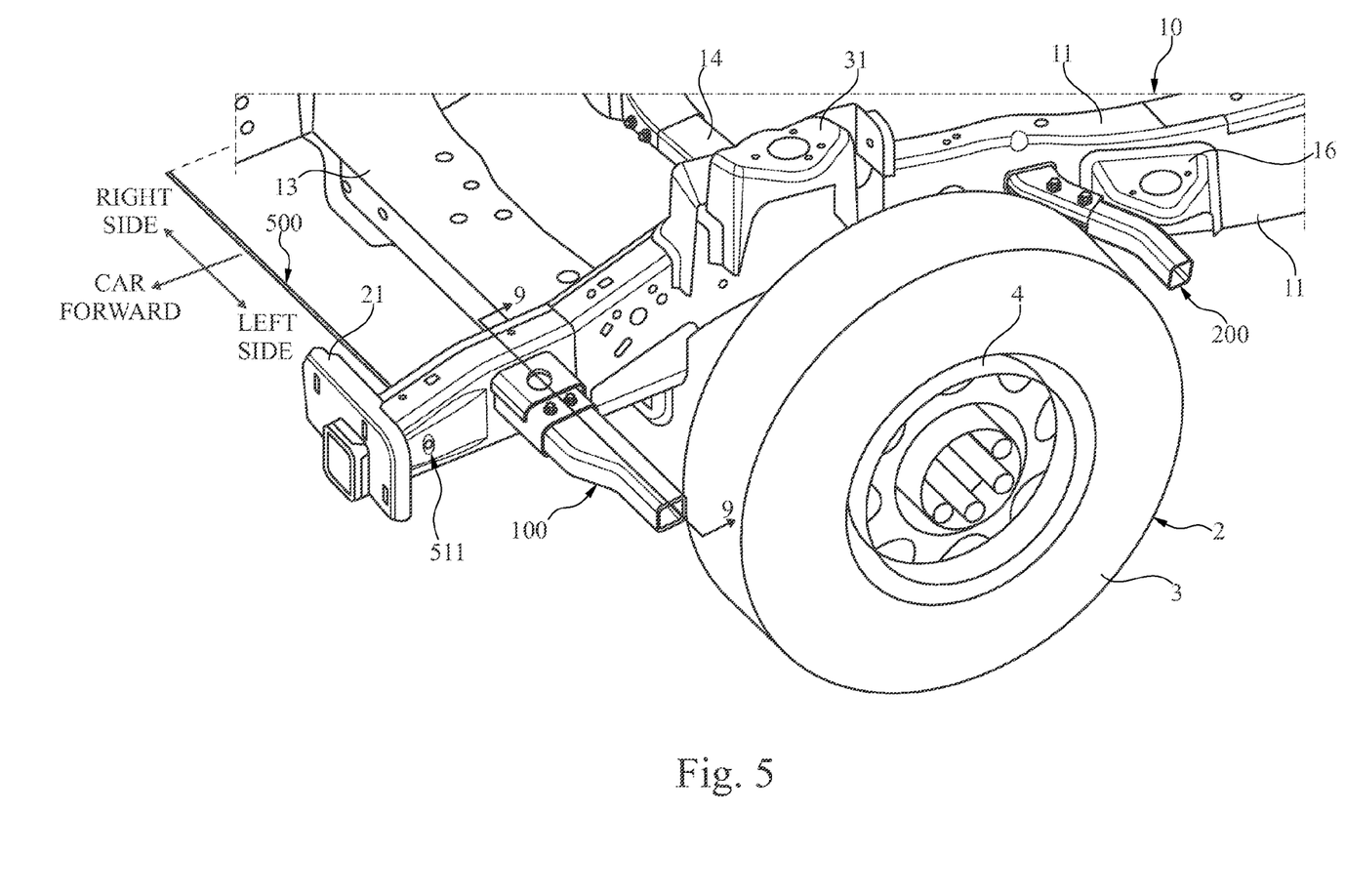
FIG. 5 is a partial, perspective graphic view of the exemplary embodiment of FIG. 4.

With particular reference now to FIGS. 4 and 5, the vehicle 1 of the present disclosure may include a small overlap impact load transfer system 500 for improving the managing and the transferring of the forces produced during a small overlap frontal impact to the vehicle 1. In one particularly exemplary embodiment of the present disclosure, the small overlap impact load transfer system 500 may include a relatively high strength cable or any other known or appropriate similar tension member 501 according to the present disclosure having a first end coupled to the horn end 513, also referred to as the horn portion 513, of the side frame rail 11 and a second end of the cable 501 coupled to the horn end 513 of the side frame rail 12 as best shown in FIG. 4. The horn ends 513 of the first and second frame rails 11 and 12, respectively, may each preferably include a passage 511 and 512, respectively, for receiving and coupling or anchoring the ends of the cable 501.

In one exemplary embodiment according to the present disclosure, the cable 501 may preferably be coupled to the horn ends 513 of the first and second frame rails 11 and 12, using any known or appropriate anchoring mechanism. Once the cable 501 is installed and coupled to the first and second frame rails 11 and 12, respectively, the cable 501 ties the horn ends 513 of the first and second frame rails 11 and 12, respectively, together so that a small overlap frontal impact to one front blocker 100, coupled to one of the first and second frame rails, is transferred to the other of the first and second frame rails thereby transferring the energy of the impact to the other side of the vehicle frame 10 and ultimately into rotational movement of the structure of the vehicle frame 10 of the vehicle 1. Additionally, the inclusion of the small overlap impact load transfer system 500 of the present disclosure is contemplated to have the benefit of having a minimal effect if the vehicle 1 experiences a full frontal impact. Further, the small overlap impact load transfer system 500 according to the present disclosure does not transfer any force from one horn end 513 of a side frame rail to the other horn end 513 of the other side frame rail such as may occur during a side impact to the front-end of the vehicle 1.

The ends of the cable 501 may be coupled or attached to the side frame rails 11 and 12 using any known or appropriate coupling or anchoring mechanism. In one particular exemplary embodiment according to the present disclosure, the ends of the cable 501 may include an eye hole for receiving a fastener or bolt for coupling the end of the cable 501 to the holes or passages 511 and 512 in the first and second side frame rails 11 and 12, respectively.

With particular reference to FIGS. 2, 3, 6, 8, 10 and 12, an alternate exemplary embodiment of the present disclosure includes a small overlap impact load transfer system 500 including a cable 501 that may have its ends coupled directly to the left and right side front blocker structures 100 and wherein the cable 501 is routed through passages 511 and 512 located distally in the horn ends 513 of the first and second side frame rails 11 and 12, respectively. The cable 501 of the current exemplary embodiment of the present disclosure may include a first portion 502 including an end 503 anchored to the left-hand side front blocker structure 100. The cable 501 of the current exemplary embodiment of the present disclosure may also include a second portion 504 including an end 505 anchored to the right-hand side front blocker structure 100. The first and second ends 503 and 505, respectively, of the first and second portions 502 and 504, respectively, of the cable 501 cable may be coupled to the front blocker structures 100 using any known or appropriate coupling or anchoring mechanism or device, similar to the prior embodiment. In the current exemplary embodiment, the passages 511 and 512 may include reinforcement or crush tube is located internally in the first and second side frame rails 11 and 12, respectively, including hollow passages for receiving the cable 501. It is contemplated that the coupling of the cable 501 to the passages 511 and 512 and/or the front blocker structures 100 may further include appropriate structures for reducing noise and vibrations while maintaining the performance of the small overlap impact load transfer system 500.

As may be appreciated from the above disclosure, the small overlap impact load transfer system 500 of the exemplary embodiments of the present disclosure only transfers the small overlap load impact forces from the one side frame rail to the other side frame rail in response to the small overlap frontal impact which engages the front blocker structure 100. Accordingly, it should be appreciated that the cable 501 is strong in tension and is compliant in compression.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless expressly stated, all ranges are intended to include both endpoints and all numbers between the endpoints. The use of "about" or "approximately" in connection with a range applies to both ends of the range. Thus, for example, "about 20 to 30" is intended to cover "about 20 to about 30", inclusive of at least the specified endpoints unless otherwise stated.

The use of the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

The disclosure of "a" or "one" to describe an element, ingredient, component or step is not intended to foreclose additional elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps.

It is understood that the present description is intended to be illustrative and not restrictive. Many embodiments as well as many applications besides the examples provided will be apparent to those of skill in the art upon understanding the present disclosure. The scope of the claimed invention should, therefore, not be determined with limiting reference to the description, but should instead be determined with reference to the appended claims, along with the full scope of equivalents to which such claims are entitled. Any disclosure of an article or reference, including patent applications and publications, is incorporated by reference herein for all purposes. Any omission in the following claims of any aspect of subject matter disclosed herein is not a disclaimer of such subject matter.

We claim:

1. A small overlap impact load transfer system for use in a vehicle having front wheels and tires and a vehicle frame having first and second side frame rails and a cross frame member located forward and proximal the front wheels and tires and wherein the each side frame rail includes a horn portion extending in a car forward direction and distal from the cross frame member, the small overlap impact load transfer system for managing the transfer of impact loads during a small overlap frontal impact to the vehicle, the small overlap impact load transfer system comprising:
   a. a first front blocker structure for coupling to the first side frame rail at a location forward of and proximal the front wheel and tire of the vehicle, the first front blocker structure extending outward from the first side frame member;
   b. a second front blocker structure for coupling to the second side frame rail at a location forward of and proximal the front wheel and tire of the vehicle, the second front blocker structure extending outward from the second side frame member; and
   c. a load transfer member having a first end for coupling to the first front blocker structure a second end for coupling to the second front blocker structure and wherein the load transfer member is designed to be routed through passages in the first and second horn portions of the first and second side frame rails for transferring small overlap impact loads from one of the first and second front blocker structures to the other of the first and second blocker structures.

2. The small overlap impact load transfer system of claim 1 wherein the load transfer member is strong in tension and compliant in compression.

3. The small overlap impact load transfer system of claim 1 wherein the load transfer member comprises a cable.

4. A vehicle comprising:
   a. front wheels and tires coupled to the vehicle;
   b. a vehicle frame having first and second side frame rails and a cross frame member located rearward and distal the front wheels and tires and wherein each of the first and second side frame rails include a horn portion located distal and forward of the cross frame member;
   c. a front blocker structure coupled to the first side frame rail at a location forward of and proximal the front wheel and tire of the vehicle, the front blocker structure extending outward from the first side frame rail;
   d. a second front blocker structure coupled to the second side frame rail at a location forward of and proximal the front wheel and tire of the vehicle, the second front blocker structure extending outward from the second side frame rail in a direction substantially opposite the first front blocker structure;
   e. a load transfer member having a first end for coupling to the first front blocker structure and a second end for coupling to the second front blocker structure and wherein the load transfer member is designed to be routed through passages in the first and second horn portions of the first and second side frame rails for transferring small overlap impact loads from one of the first and second front blocker structures to the other of the first and second blocker structures.

5. The vehicle of claim 4 further comprising a body for coupling to the vehicle frame.

6. The vehicle of claim 4 wherein the load transfer member is strong in tension and compliant in compression.

7. The vehicle of claim 4 wherein the load transfer member comprises a cable.

8. The vehicle claim 7 wherein the load transfer member comprises a cable.

9. A vehicle frame comprising:
   a first frame rail and a second frame rail spaced from the first frame rail;
   a blocker cantilevered from the first frame rail and configured to engage a vehicle wheel during an offset frontal impact; and
   a cable extending from the first frame rail to the second frame rail.

10. The vehicle frame of claim 9 wherein the cable extends from the first frame rail to the blocker.

11. The vehicle frame of claim 9 wherein the first frame rail includes passage, and wherein the cable extends from the second frame rail through the passage to the blocker.

12. The vehicle frame of claim 9 further comprising a second blocker cantilevered from the second frame rail and configured to engage a vehicle wheel during an offset frontal impact, and wherein the cable extends from the first frame rail to the blocker, and wherein the cable extends from the second frame rail to the second blocker.

13. The vehicle frame of claim 12 wherein the cable is anchored to the blocker and the second blocker.

14. The vehicle frame of claim 12 wherein the first frame rail and the second frame rail each define a passage and the cable extends through the passages.

15. The vehicle frame of claim 9 wherein the cable is anchored to the first frame rail and the second frame rail.

16. The vehicle frame of claim 9 wherein the cable extends along a straight line from the first frame rail to the second frame rail.

* * * * *